United States Patent [19]

Goldman et al.

[11] 4,412,960

[45] Nov. 1, 1983

[54] METHOD FOR PROCESSING A STRIP OF POLYMER MATERIAL BY ELECTRICAL DISCHARGE

[75] Inventors: Alice Goldman; Daniel Le Fur, both of Gif Sur Yvette, France

[73] Assignee: Electricite De France, Paris, France

[21] Appl. No.: 241,644

[22] Filed: Mar. 9, 1981

[30] Foreign Application Priority Data

Mar. 11, 1980 [FR] France .................... 80 05441

[51] Int. Cl.³ ................... H01T 19/04; B01J 19/12
[52] U.S. Cl. ................... 264/22; 204/165; 204/168; 264/162; 422/186.05; 422/186.21
[58] Field of Search .......... 422/186.05, 186.21; 264/22, 162; 204/165, 168, 224 R, 224 M

[56] References Cited

U.S. PATENT DOCUMENTS

| | | | |
|---|---|---|---|
| 2,608,717 | 9/1952 | Kay | 264/22 |
| 2,859,480 | 11/1958 | Berthold et al. | 204/168 |
| 2,939,956 | 6/1960 | Parks | 204/165 X |
| 3,057,792 | 10/1962 | Fröhlich | 204/165 |
| 3,067,119 | 12/1962 | Ramaika | 204/168 |
| 3,196,270 | 7/1965 | Rosenthal | 204/168 X |
| 3,282,833 | 11/1966 | Pfeffer, Jr. | 204/168 |
| 3,308,045 | 3/1967 | Sullivan | 204/165 |
| 3,369,982 | 2/1968 | Wood | 422/186.05 X |
| 3,376,208 | 4/1968 | Wood | 204/168 |
| 3,377,262 | 4/1968 | Karickhoff et al. | 204/165 |
| 3,391,070 | 7/1968 | Morgan | 204/168 |
| 3,396,308 | 8/1968 | Whitmore | 422/186.05 X |
| 3,405,052 | 10/1968 | Schirmer | 422/186.05 |
| 3,470,274 | 9/1969 | Sandiford et al. | 422/186.05 X |
| 3,503,859 | 3/1970 | Concarovs et al. | 422/186.05 X |
| 3,514,393 | 5/1970 | Eisby | 204/165 X |
| 3,546,065 | 12/1970 | Ostermeier | 204/168 X |
| 3,661,735 | 5/1972 | Drelich | 422/186.05 X |
| 3,736,493 | 5/1973 | Rosenthal et al. | 422/186.05 X |
| 3,796,885 | 3/1974 | Shofner | 264/22 X |
| 3,820,929 | 6/1974 | Busby et al. | 264/22 X |
| 3,829,408 | 8/1974 | Wolkowicz | 264/22 X |
| 3,888,753 | 6/1975 | Kiikka et al. | 204/165 X |
| 3,959,104 | 5/1976 | Pales | 204/165 X |
| 3,982,863 | 9/1976 | Latham et al. | 264/22 X |
| 4,024,038 | 5/1977 | Luc | 204/168 |
| 4,046,842 | 9/1977 | Groves et al. | 264/22 |
| 4,059,497 | 11/1977 | Kolbe et al. | 204/165 |
| 4,071,589 | 1/1978 | Latham et al. | 264/22 |
| 4,145,386 | 3/1979 | Rosenthal | 264/22 |
| 4,239,973 | 12/1980 | Kolbe et al. | 422/186 X |
| 4,298,440 | 11/1981 | Hood | 204/165 |

FOREIGN PATENT DOCUMENTS

| | | | |
|---|---|---|---|
| 39-21137 | 9/1964 | Japan | 264/22 |
| 961384 | 6/1964 | United Kingdom | 264/22 |

Primary Examiner—Philip E. Anderson
Attorney, Agent, or Firm—Larson and Taylor

[57] ABSTRACT

The strip material to be processed is passed successively at a first location and a second location. In the first location, electrical charges are deposited on one surface of the strip by corona discharge between an electrically conducting support for the strip and a wire electrode. At the second location, a sliding arc is created along the charge surface of the strip between two electrodes. Due to the prior deposit of charges, the alternating voltage to be established between the electrodes is much decreased.

5 Claims, 3 Drawing Figures

METHOD FOR PROCESSING A STRIP OF POLYMER MATERIAL BY ELECTRICAL DISCHARGE

BACKGROUND AND SUMMARY OF THE INVENTION

The present invention relates to electrical discharge processing of polymer material, in strip form, particularly for increasing the aptitude of the strip material to receive adherent products.

Polymers in strip form are of considerable industrial interest. Strips constituted by a continuous film are used for wrapping food products, for manufacture of photographic films and as printing supports. Strips of porous polymeric material or fabric are also widely used.

For use, the strips must be adapted to ink reception, to coating or to complexing. In order that the treatments may be carried out under good conditions, it is necessary to subject the polymer strip material to a preliminary treatment improving surface adhesivity. For this purpose there have been used processing by oxidizing solutions, by flame and by corona discharge.

It is an object of the invention to provide an improved processing method which does not require the use of toxic chemical substances and authorize high processing speeds.

According to an aspect of the invention the strip is passed successively at a first emplacement where electrical charges are deposited on one surface of the strip, then at a second emplacement where an arc is created sliding along said surface of the strip between electrodes subjected to alternating high voltage.

It is possible to use various methods to deposit the charges on the strip. In particular, it is possible to use charged particle-emitting radio-elements. However, a much preferable solution consists of depositing the charges on the strip by corona discharge between a conductive support bearing the strip and a wire electrode parallel to the support and brought to a negative voltage with respect to the latter.

According to another aspect of the invention, an apparatus utilized for processing polymer strip material in strip form by electrical discharge comprises a support arranged to receive the strip; a wire electrode substantially parallel to the support, whose radius of curvature is very much smaller than that of the support; means for establishing a voltage between the support and the electrode which is selected for creating a current by corona effect depositing charges on the strip; electrode means located at an emplacement for the passage of the strip downstream of the wire electrode; and means for establishing between said electrode means an alternating voltage creating an arc sliding along that surface of the strip which has received the charges.

When the strip is of great width, it is possible to provide more than two electrodes distributed across the strip and associated in pairs with AC generators.

The invention will be better understood from the following description of an apparatus which constitutes a particular embodiment, given by way of example only.

SHORT DESCRIPTION OF DRAWINGS

Figure 3:
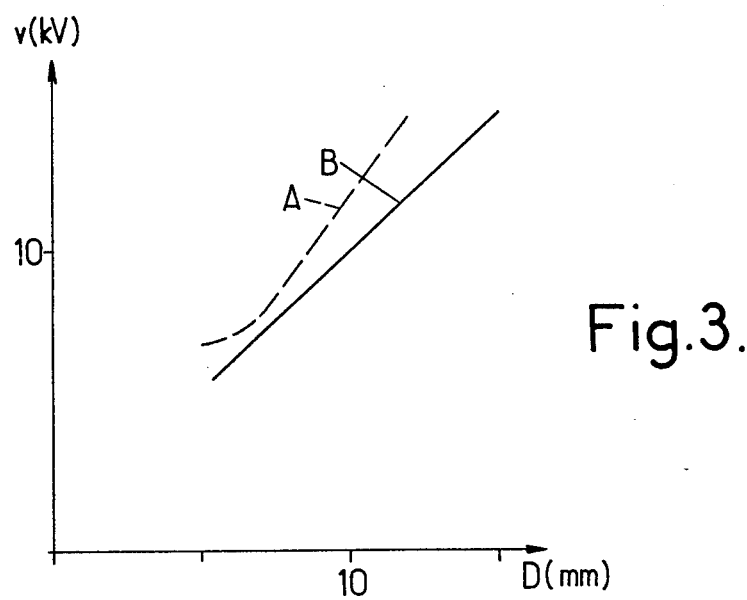

FIG. 3 indicates the variation of voltage V at which an arc is triggered, plotted against the distance D between the electrodes, when the strip has not received charges (curve A) and when it has received charges by corona effect (curve B).

DETAILED DESCRIPTION OF A PARTICULAR EMBODIMENT

Figure 1:
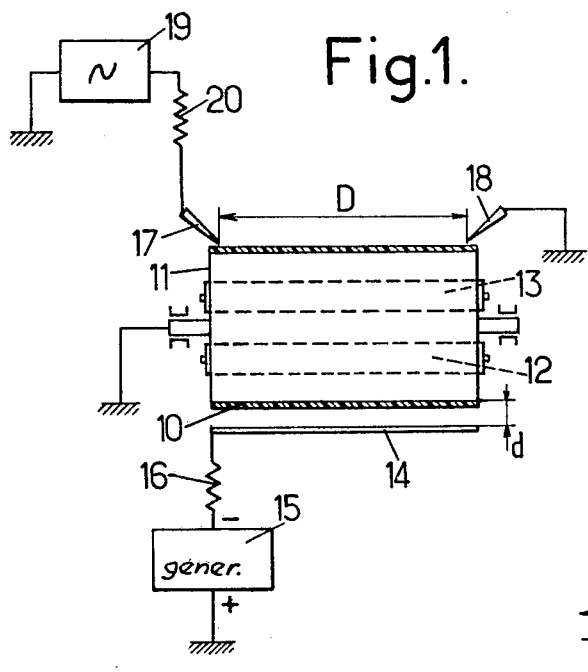
FIG. 1 is a schematic diagram of the device, shown in elevation.
Figure 2:
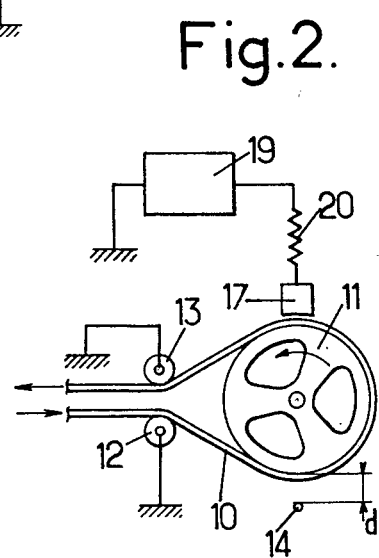
FIG. 2 is a diagram showing the device seen from the left of FIG. 1.

The apparatus shown diagrammatically in FIGS. 1 and 2 is for processing a strip 10 of polymer material, which will be assumed to be a polyester film of some tens of microns in thickness.

The apparatus comprises a support 11 constituted by a rotary drum of electrically conducting material, connected to ground. The drum guides the strip and in addition moves it along a predetermined path. Two rollers 12 and 13 keep the strip 10 in contact with the drum 11.

On its path, the strip 10 passes at a first location, under a wire electrode 14 parallel to the axis of the drum and borne by a voltage generator 15 to a negative potential with respect to the drum, which potential is sufficient to create a corona discharge. The voltage $V_0$ applied to the wire electrode 14 will be selected as a function of a distance d between the wire electrode 14 and the drum 11. For a predetermined voltage $V_0$, the amount of charges that will be deposited will increase if d is decreased. A resistor 16 is inserted in the circuit of the generator 15 to avoid flashover of an arc.

The wire electrode 14 typically has a diameter of some tens of microns, the generator 15 will provide a high voltage of some kV and the resistor will have a value of about 10 Mohms. By way of example, satisfactory results have been obtained with $V_0=9$ kV, $d=3$ mm and an electrode diameter of 25 microns, when the polyester strip is 36 microns thick.

A current of some micro-amperes per centimeter of electrode length then flows from the wire electrode 14 to the support 11.

The strip 10 carried by the drum 11 then is moved through a second location where it is subjected to a sliding or "creeping" AC electrical discharge. At the second location, two electrode blades 17 and 18 are arranged with their end edges in immediate proximity of the strip 10. A generator 19 applies a voltage sufficient to maintain an arc between the electrodes 17 and 18. The generator 19 is alternating, so as not to deposit electrical charges to the film. An impedance 20 is inserted in the circuit of generator 19 to limit the electrical current. The frequency of the generator is advantageously high enough for using an inductance as impedance 20. An order of magnitude of a kilohertz or more will generally provide satisfactory results. It is possible however to work at the frequency of the mains and to use a resistor as impedance 20.

For a sufficient value of the voltage, a discharge occurs and is maintained between electrodes 17 and 18. The discharge creeps along the surface of the strip 10 and is guided by the electrically conducting surface of the drum 11 beneath the strip.

Due to the prior deposit of charges on the strip by the auxiliary corona discharge, the voltage V to be supplied by the generator 19 is distinctly lowered, as it appears in FIG. 3. Curve A indicates the voltage V to be applied in the absence of prior charge deposit. Curve B indicates the necessary voltage with a prior deposit of charges under a voltage of 9 kV by means of a wire electrode 14 of 25 microns diameter spaced 3 mm from the drum. By reducing the distance d, it is possible to increase further the amount of charges deposited and to reduce correlatively the arc striking voltage V.

Tests have shown that satisfactory improvements of the surface properties of a polyester film are obtained with a strip speed of 80 cm/m, while the same results are obtained by corona discharge only if the speed is decreased to about 2 cm/m.

Referring to FIG. 3, it will be apparent that the arc striking voltage V increases with the distance D between electrodes 17 and 18. When the processed strip is wide, it is possible to fractionate the total discharge interval into any number n of intervals in series, by using n+1 electrodes. The intervals will be fed in parallel relation by separate generators.

The invention enables to process films of continuous material as well as porous films or even woven strips. The discharge then creeps along the strip and penetrates it. In all cases, scorching of the strip is avoided due to the limitation of the electrical current by the quenching impedance 20.

Numerous variations of the described embodiment will be apparent to the technician, particularly in respect of the operating conditions. The invention may be used to process dielectric polymers, such as polyamide and polypropylene, other than polyesters. It must be understood that the scope of the present patent extends to such modifications, and more generally to all other modifications remaining within the scope of the following claims.

We claim:

1. Method for processing dielectric polymer material in strip form by electrical discharge, comprising circulating a strip of polymer material of predetermined width along a path for passing it successively at a first location and at a second location, depositing electrical charges on one surface of the strip as it passes at said first location and maintaining a sliding arc transversal to said path, throughout said width along said surface of the strip between electrodes subjected to an alternating high voltage at said second location.

2. Method according to claim 1, wherein the charges are deposited by corona discharge between a conductive support bearing the strip and a wire electrode parallel to said support and brought to a negative voltage with respect to said support.

3. Method according to claim 1, wherein said arc is fractionated into a plurality n of arc intervals each defined between two adjacent ones of said n+1 electrodes distributed transversely to the direction of circulation of the strip, said electrodes being associated by pairs with respective AC voltage generators.

4. A method for processing dielectric polymer material in strip form by electric discharge, comprising the steps of: supporting the strip of polymer material on an electrically conductive support means; moving said support means to circulate said strip along a predetermined path; locating wire electrode means in substantially parallel relation to the support means and separated therefrom by said strip at a first location along said path, said wire electrode means having a curvature much higher than the curvature of the support; establishing an electrical potential difference between said support means and said wire electrode means for creating a current by corona effect and depositing electrical charges on that surface of said strip which confronts the wire electrode means; locating additional electrodes defining an interelectrode space transverse to said path at a second location downstream of said wire electrode means along said predetermined path, said electrodes being close to said surface of said strip; and establishing between said additional electrodes an alternating voltage for creating an arc sliding along the surface of the strip which has received the charges.

5. A method according to claim 4, wherein said support means consists of a rotatable conductive drive drum supporting said strip on part of its cylindrical outside surface and wherein said wire electrode means and said additional electrode means are adjacent to said drum at successive locations in the direction of rotation of said drum and are respectively parallel to the axis of rotation of said drum and arranged to maintain an arc transversal to the direction of movement of said strip.

* * * * *